United States Patent

[11] 3,569,851

[72] Inventor Andreas Jaumann
Ebenhausen, Germany
[21] Appl. No. 722,601
[22] Filed Apr. 19, 1968
[45] Patented Mar. 9, 1971
[73] Assignee Siemens Aktiengesellschaft
Berlin, Germany
[32] Priorities Apr. 20, 1967
[33] Germany
[31] S 109,429;
Jan. 26, 1968, Switzerland, No. 1262/68

[54] ELECTRICAL FILTER CIRCUIT
8 Claims, 12 Drawing Figs.

[52] U.S. Cl. .......... 330/109, 330/86
[51] Int. Cl. .......... H03f 3/52
[50] Field of Search .......... 330/109, 86, 144, 81

[56] References Cited
UNITED STATES PATENTS

| | | | |
|---|---|---|---|
| 2,724,807 | 11/1955 | Rex | 330/109X |
| 2,761,021 | 8/1956 | Leuthold | 330/109X |
| 2,987,678 | 6/1961 | Miller et al. | 330/109 |
| 3,207,959 | 9/1965 | Miller | 330/109X |

*Primary Examiner*—Nathan Kaufman
*Attorneys*—Curt M. Avery, Arthur E. Wilfond, Herbert L. Lerner and Daniel J. Tick

ABSTRACT: An electrical filter comprises an amplifier with a pair of push-pull terminals on its input and/or output side. A frequency-selective network forms a negative feedback from the output to the input of the amplifier. A bridge circuit constituted by circuit components of the network as well as by the pair of push-pull terminals, has branches whose respective reactive impedances differ from one another as regards their dependence upon frequency so as to conjointly define a pair of null points for the damping function of the transmitting attenuation of the filter.

Patented March 9, 1971 3,569,851

6 Sheets-Sheet 3

ELECTRICAL FILTER CIRCUIT

My invention relates to electrical filter networks of the type comprising an operational amplifier with a negative feedback connection through a frequency-selective network.

Heretofore, as a rule, the filter networks for electrical communication, especially broadcasting techniques, have been composed of frequency-determining components constituted by capacitors and inductance coils of lowest feasible losses. More recently, the general trend toward minimizing the size of broadcasting and other communication equipment has led to developing a line of filters of the so-called microminiaturized type (see, for example, the book "Microminiaturization," Pergamon Press 1962). Coils of the conventional type occupy too much space for filters of this type. Electrical circuits have therefore been developed in which the inductance coils are replaced by other components that secure the same effect but comprise only transistors aside from capacitors and resistors. Known circuits of this kind are described, for example, in "-Proceedings IEE" Vol. 112, No. 5, May 1965, pages 901 – 914. In most cases, the transistors in such circuits have the form of so-called "operational amplifiers," and microminiaturization leads to the attempt of using as few capacitors as possible and also providing the smallest possible number of operational amplifiers for realizing a predetermined characteristic of the transmission attenuation of a filter.

The pole localities and null localities of the damping function, decisive for the transmission qualities of such four-pole filter, are preferably represented in the so-called frequency plane to afford better clarity and simpler mathematical treatment. Although the same manner of representation is used in the following description of the invention, it will be unnecessary to offer a detailed explanation, because the method is commonly understood and applied in mathematical matters of this kind by those skilled in the art. Pertinent explanations, for example, are found in the book by Feldtkeller "Einfuhrung in die Theorie der Hochfrequenz-Bandfilter," , 5th Edition, published by Hirzel Verlag, Stuttgart, Germany (Chapter 41); also in the book by Bode "Network Analysis and Feedback Design," pages 18–30; and in "Taschenbuch der Hochfrequenztechnik" by Meinke-Gundlach, 2nd Edition, pages 1135–1136.

It is an object of my invention, relating to filter networks of the kind introductorily described, to produce a highest possible predetermined number of pole pairs and/or null-point pairs of the filter transmission function with the lowest feasible number of operational amplifiers and capacitors.

To this end, and in accordance with my invention, I provide an electrical filter with an operational amplifier which has a negative feedback extend through a frequency-selective network and which has a pair of differential terminals on one or both of its input and output sides. The negative feedback path further has at least one bridge circuit formed by circuit components of the frequency-selective network in conjunction with the differential terminal pair; and the branches of the bridge circuit have respective reactive impedances which differ from one another as to their dependence upon frequency so as to thereby define a null-point pair for the damping function of the transmission attenuation of the filter.

It is another, more specific object of my invention to simplify the production and improve the reliability of such a circuit organization.

According to another feature of the invention, therefore, it is of advantage to have the bridge circuit of the above-described circuit organization composed only of resistors and capacitors. According to another, preferred feature of my invention, one of the bridge branches contains a resistor-capacitor series connection, and another bridge branch contains a resistor-capacitor parallel connection.

In conjunction with the foregoing, it is another object of my invention to secure particularly favorable conditions by achieving a defined pole- and a null-point pair with the aid of only one resistance-capacitor bridge circuit.

To this end, and in accordance with a further feature of my invention, one of the branches of the above-mentioned bridge circuit within the filter organization is provided with a tap, and this tap is connected with one terminal of the output terminal pair of the filter and determines the pole-point pair of the damping function.

According to still another feature of my invention, the operational amplifier is provided with a differential input, as well as with a differential output, and possesses a highest feasible degree of suppression of signal synchronism; the network in the feedback path being equipped with two bridge circuits of which one is formed in conjunction with the differential input, while the other is formed in conjunction with the differential output of the operational amplifier, each of the bridge circuits defining a null-point pair of the damping function. With such a circuit arrangement, the provision of a tap in one of the bridge circuits further affords the formation of a pole-point pair.

According to another, alternative feature of my invention, two parallel connected bridge circuits are provided in the input and/or output of the amplifier, and only one of the two parallel bridge circuits is located in the negative feedback path whereas the other bridge circuit leads to a terminal of a correlated terminal pair of the filter and serves for forming a pole-point pair.

It is further of advantage to produce filters of higher order by chain connecting a number of filter four-poles designed according to the invention.

The foregoing and further objects, advantages and features of my invention, said features being set forth with particularity in the claims annexed hereto, will be apparent from, and will be further explained in, the following with reference to embodiments of filters according to the invention illustrated by way of example in the accompanying drawings, in which:

The task of designing active RC-filters involves realizing a given transmission function with the fewest possible capacitors because these, in integrated circuitry, are considerably more expensive than resistors and transistors.

Figure 1:
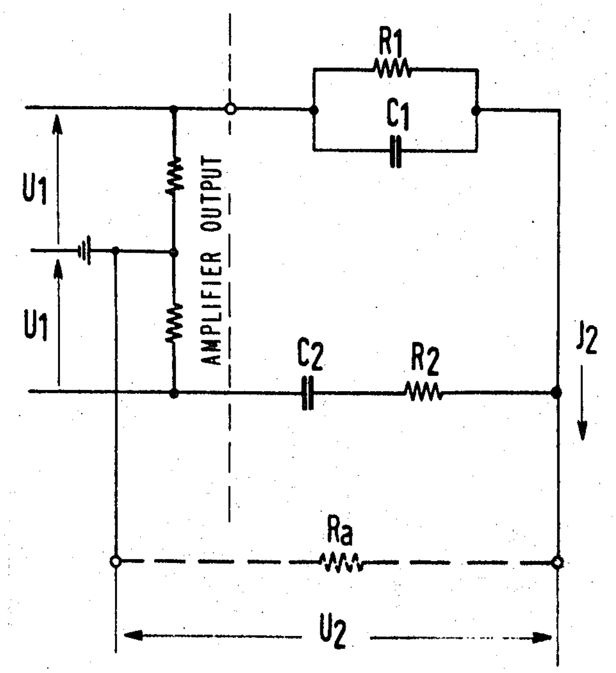
FIGS. 1 and 2 are circuit diagrams of filter fundamental components respectively.

In this respect the RC-bridge (FIG. 1) constitutes a favorable circuit for producing either a pole pair or, used as negative feedback four-pole, a null-point pair. Only two capacitors are needed for each pair. The active component is an integrated differential amplifier, also called operational amplifier.

Figure 2:
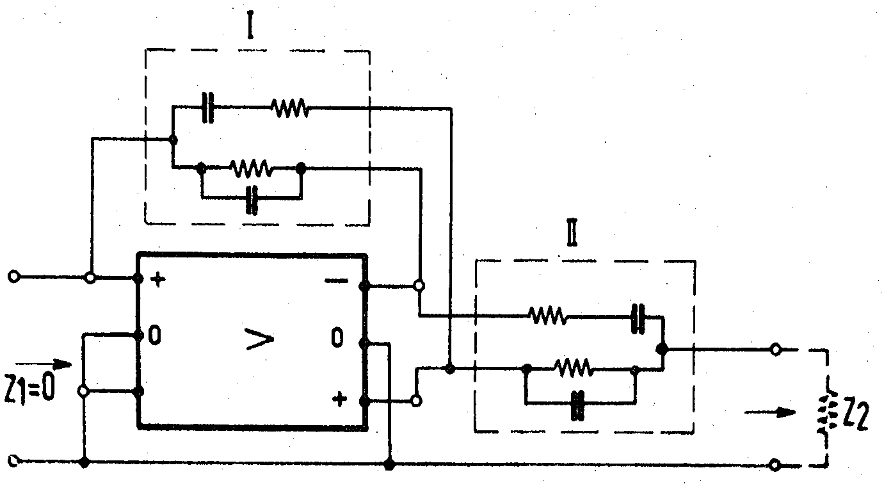

FIG. 2 shows the design of a filter fundamental member which provides for a null-point pair and a pole pair as component factor of a transmission function. Filters of the higher orders are then obtained by chain connecting several such fundamental members. A low pass of the order $2n+1$ with $n+1/2$ poles of the echo damping in the pass band and $n+1/2$ poles of the operation damping in the blocking range, thus requires a total of $n$ amplifier units with $4n$ capacitors.

The bridge four-poles in such a filter have their input side connected to constant voltage ($U_1$) since the output resistance of the negative feedback amplifier is zero. Most of the four-poles are short-circuited at the output side ($R_n = 0$). The four-poles (I) of the negative feedback which produce the null points, are loaded by the very low input resistance of the appertaining amplifier ($z_1 = 0$). The blocking four-poles (II) which produce the poles of the transmission function, are shorted by the input resistance of the next following amplifier unit ($z_2 = 0$). Only the four-pole (II) at the end of the entire filter is preferably loaded by a resistor $R_n$. As a result, an additional null point can be enforced on the negative real frequency axis.

The transmission function of the short circuited bridge (FIG. 1, $R_a=0$) is as follows:

$$\frac{U_1}{J_2}=\frac{R_1(1+pC_2R_2)}{1+p(C_1R_1+C_2R_2-C_2R_1)+p^2C_1R_1C_2R_2}$$

$$=\frac{p+\sigma_m}{C_1(p+\sigma_0-j\omega_0)(p+\sigma_0+j\omega_0)} \quad (1)$$

In this equation, $\sigma_o \pm j\omega_o$ denotes the position of the null-point pair or pole pair and hence is to be considered as pregiven. The value $\sigma_m$ can be arbitrarily chosen but must be the same for the two bridges (I and II) appertaining to an amplifier unit (this value then cancels out of the total transmission function).

The magnitude of the circuit components can be readily determined from equation (1). One finds for Negative feedback bridge I:

$$R_{1+}=\left(1+\frac{\sigma_m^2-2\sigma_0\sigma_m}{\sigma_0^2+\omega_0^2}\right)R_2$$

$$1/C_{1I}=\left(\sigma_m-2\sigma_0+\frac{\sigma_0^2+\omega_0^2}{\sigma_m}\right)R_2$$

$$1/C_2=\sigma_m R_2$$

Blocking bridge II: $(\sigma_0=0;\ \omega_0=\omega_s)$ $$R_{1II}=\left(1+\frac{\sigma_m^2}{\omega_s^2}\right)R_2$$

$$1/C_{1II}=\left(\sigma_m+\frac{\omega_s^2}{\sigma_m}\right)R_2$$

$$1/C_2=\sigma_m R_2$$

The transfer function of the amplifier unit (FIG. 2) then reads as follows:

$$\frac{J_1}{J_2}=\frac{C_{1I}}{C_{1II}}\cdot\frac{p^2+2\sigma_0 p+\sigma_0^2+\omega_0^2}{p^2+\omega_s^2}$$

Figure 3:
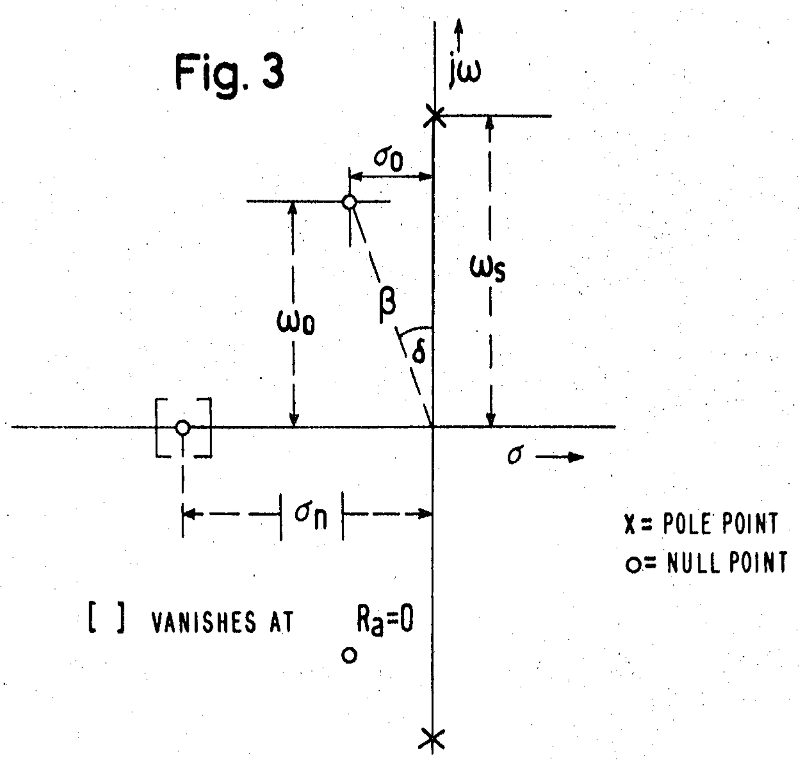
FIGS. 3 and 4 are explanatory graphs.

The appertaining pole- and null-point plan is shown in FIG. 3.

The resistance-loaded, compensated bridge (FIG. 1, $R_a$ 0) is employed as the last member of the amplifier chain if a filter of an odd order ($n=3, 5, 7$) with a zero point $\sigma_n$ on the regular real frequency axis is to be designed. For such a filter we obtain the transfer function $$\frac{U_1}{U_2}=\frac{R_a+R_1+p(2R_a+R_2)C_2R_1+p^2C_1R_1C_2R_2R_a}{R_a(1+p^2C_1R_1C_2R_2)}$$

$$=\frac{(p+\sigma_m)(p+\sigma_n)}{p^2+\omega_s^2} \quad (2)$$

The null point $\sigma_n$ is given. The other root $\sigma_m$, however, must not be below a minimum value if the following formulas for the circuit components, obtained from equation (2), are to yield positive, real values:

$$v=\frac{1}{4}[\sigma_n+\sigma_m\pm\sqrt{\sigma_n^2-6\cdot\sigma_m\sigma_n+\sigma_m^2-8}]$$

$$R_1=(1+v^2)R_2$$

$$R_a=\frac{\omega_s^2(1+v^2)}{\sigma_m\sigma_n-\omega_s^2}\cdot R_2$$

$$1/C_1=\left(v+\frac{1}{v}\right)\omega_s R_2$$

$$1/C_2=v\omega_s R_2$$

Sensitivity to Changes of R, C

In the calculation of the circuit components for an amplifier unit intended to realize a given pole- and null-point pair, the value $\sigma_m$ was left arbitrarily selective, this value representing the null-point of the transfer function of the bridges. It is of interest to determine the influence this parameter will have upon the sensitivity of the bridges relative to fluctuations in electrical properties of the circuit components.

In the transmission function the null-point pairs correspond to factors of the form (see FIG. 3):

$$p^2+2\sigma_0 p+\beta^2=\left[\left(\frac{p}{\beta}\right)^2+\frac{2\sigma_0}{\beta}\cdot\left(\frac{p}{\beta}\right)+1\right]\beta^2$$

Apparently, the magnitude sin $$\delta=\frac{\sigma_0}{\beta}$$

determines the shape of the transmission curve, for example the formation of attenuation or amplification peaks. If this magnitude remains constant, that is, when $\sigma_o$ and $\beta$ vary to the same extent, only the measuring scale of the frequency will be affected, whereas the character of the curve remains invariable. We shall consider this variation as less critical. Accordingly, as a measure of the possible detuning that is to remain as small as possible, we apply the condition:

$$\sin\delta=\frac{\sigma_0}{\beta}=\frac{C_1R_1+C_2R_2-C_2R_1}{C_1R_1C_2R_2}$$

$$=\sqrt{\frac{C_1R_1}{C_2R_2}}+\sqrt{\frac{C_2R_2}{C_1R_2}}-\sqrt{\frac{C_2R_1}{C_1R_2}}$$

Upon differentiation, we set:

$$C_1R_1+C_2R_2=C_2R_1$$

that is, we limit our investigation to the case in which the null-points are close to the imaginary frequency axis ($\sigma_o \ll \beta$), this case being particularly susceptible to changes. For abbreviation we introduce the magnitude:

$$v=\sqrt{\frac{C_1R_1}{C_2R_2}}=\frac{\sqrt{\sigma_0^2+\omega_0^2}}{\sigma_m}$$

This leads to:

$$d\ (\sin\vartheta)=v\left(\frac{dC_1}{C_1}-\frac{dC_2}{C_2}\right)+\frac{1}{v}\left(\frac{dR_2}{R_2}-\frac{dR_1}{R_1}\right)$$

Figure 4:
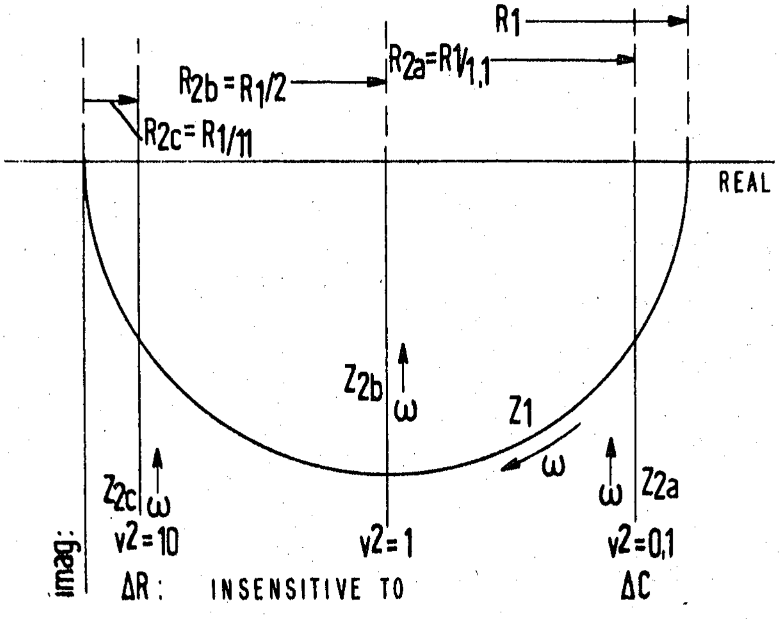

The following will be recognized from this equation: For $v=1$ ($\sigma_m^2=\sigma_o^2+\omega_o$) the detuning effect of C and R are equal in weight. If a considerably larger detuning of C than of R is to be expected, it is advisable to make $v<1$. For example, if $$\frac{dC}{C}=1\%,\ \frac{dR}{R}=0.1\%$$

there results as the most favorable dimensioning: $v=\sqrt{0.1}$ ($\sigma_m=10(\sigma_o^2\omega_o^2)$). FIG. 4 shows how this manifests itself in the course of the reactive impedance of the two bridge branches.

In the example described so far, a null-point pair and a pole pair of the filter transmission function is defined with the aid of two RC bridge circuits of which one is chain-connected with the amplifier and produces the pole pair, whereas the other is negatively feedback connected with the amplifier input for producing the null-point pair (FIG. 2).

Figure 5:
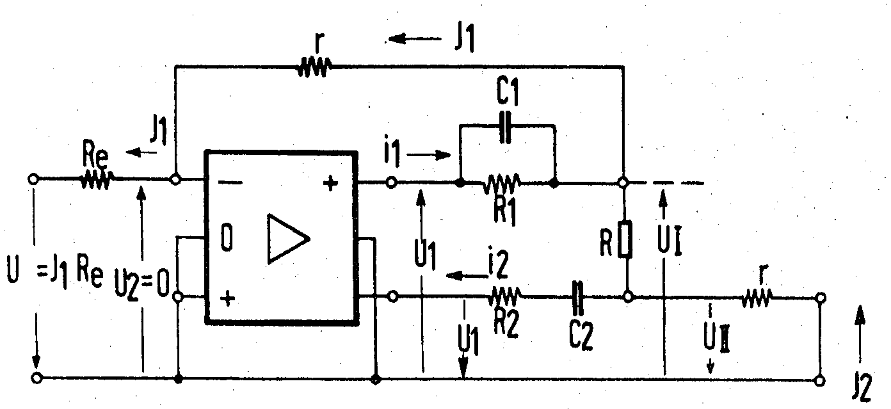
FIG. 5 is a circuit diagram of a complete filter according to the invention.

According to a further development of my invention, however, a single bridge circuit with only two capacitors suffices for producing a pole-pair plus a null-point pair, if one subdivides the bridge resistance $R_2$. A corresponding design of the amplifier unit is shown in FIG. 5. The transmission function may assume the following form:

$$\frac{U_0}{U_{II}}=\frac{(1+p/(\sigma_0-j\omega_0))(1+p/(\sigma_0+j\omega_0))}{1+p^2/\omega_s^2}$$

if the following condition is observed:

$$R_e=r^2/(R+r)\approx r(R\ll r)$$

$$R_1C_1C_2(R_2-R)=1/\omega_s^2$$

$$R_1C_1C_2\left(R_2\frac{R}{1+R/r}\right)=1/(\omega_0^2+\sigma_0^2) \quad \text{(I)}$$

$$R_1C_1+C_2(R_2-R-R_1-R_1R/r)=0$$

$$R_1C_1+C_2\left(R_2+\frac{R-R_1}{1+R/r}\right)=2\sigma_0/(\omega_0^2+\sigma_0^2)$$

The position of the null-point $\sigma_o \pm j\omega_o$ and of the pole: $\pm j\omega_s$ are given. On this basis and applying the equation (1), the magnitude of the circuit components can be determined.

For obtaining a low pass of the order $2n$ with $n$ poles of the echo damping in the pass band and $n$ poles of the operating damping in the blocking range, a corresponding plurality of $n$ amplifier units are directly connected in chain relation with each other so that the input impedance $R_e$ of each subsequent unit becomes identical with the output impedance $r$ of the next preceding unit.

Figure 6:
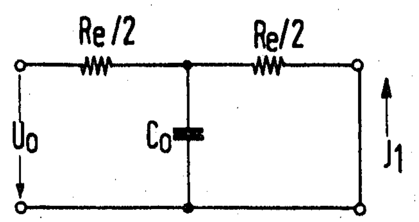
FIG. 6 is an explanatory diagram of a filter component.

For low passes of an odd number (2=n+1) an additional null-point $\sigma_n$ on the negative real frequency axis is needed.

null point comes about if 4/Rthe input resistance $R_e$ of the first amplifier unit by the RC member of FIG. 6.

This corresponds to the equation:

$U_o/J_1 = R_e(1+pC_oR_c/4) = R_e(1+p/\sigma_n)$ $C_o = 4/\mathrm{Re}\,\sigma_n$ Accordingly, and by way of example, a low pass of the order $m$ requires a total of $m$ capacitors and hence no more capacitors than are contained in a normal LC low pass. For each inductance coil there are substituted five resistors and an integrated normal amplifier. Counted among the five resistors are the two symmetrizing resistors of the amplifier output. All other components of the amplifier need neither be particularly precise as to constancy nor as to balance compensation.

Analogously, the circuitry according to FIG. 5 is also applicable as a high pass filter if the negative feedback is derived not from point $x$ but from point $y$ and the amplifier output is connected to $x$. The input circuit according to FIG. 6, if employed, is then to be correspondingly revised.

A band filter characteristic is obtained, for example, by means of a chain connection of at least one high pass and at least one low pass filter.

Numerical Example for a Low Pass $f_s = 4.775$ kHz. ($\omega_s = 3.10^4$)

$f_o = 4.416$ kHz. ($\omega_o = 2.77443.10^4$)

$\sigma_o/2\pi = 0.190$ kHz. ($\sigma_o = 0.11918.10^4$)

One of the circuit components can be freely chosen. The others are then found to be:

$R = 0.0773\ k\Omega$ $r = 12.763\ k\Omega$ $R_1 = 14.597\ k\Omega$ $R_2 = 1\ k\Omega$ $C_1 = 7.9375\ nF$ $C_2 = 8.4186\ nF$.

The circuitry of the low pass may also be dimensioned for considerably higher frequencies, this being also applicable to the other features disclosed herein with reference to circuitry according to the invention. Only the effect of any stray capacitances must then be taken onto account.

Figure 7:
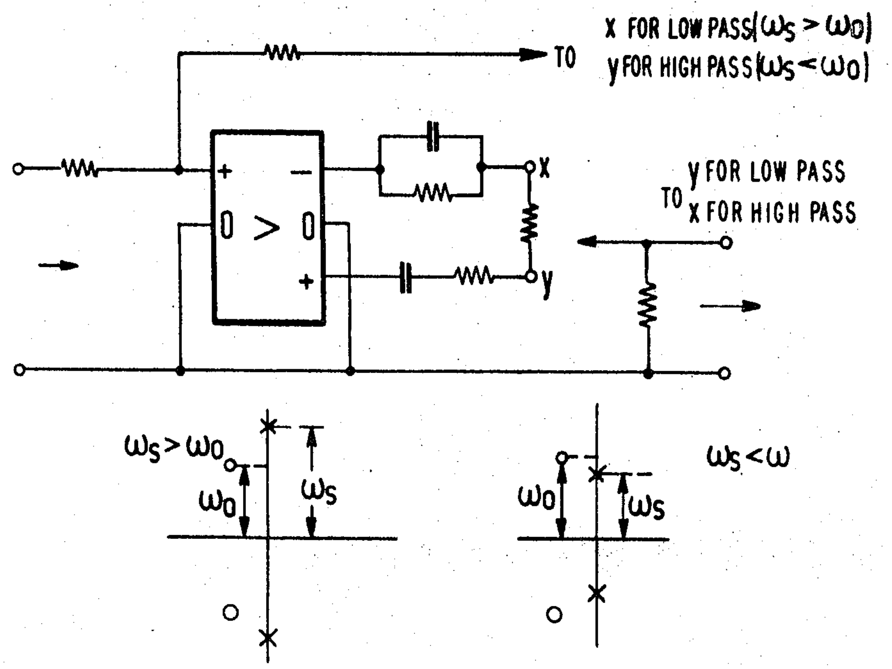
FIGS. 7 and 8 show different filter system diagrams according to the invention.

Regardless of whether a high pass or low pass is involved, the filter circuitry according to FIG. 5 permits deducing a fundamental diagram of the type shown in FIG. 7 together with an appertaining plan of frequencies.

Figure 8:
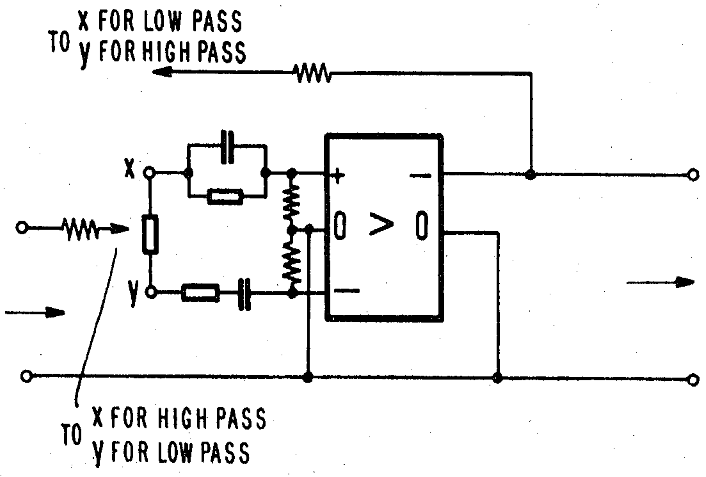

If the operational amplifier has a push-pull input as shown in FIG. 8, this fundamental circuitry can be used analogously on the input side. In this case, as indicated, it is advisable to provide two separate resistors in the input circuit of the operational amplifier, and these resistors then appertain, so to say, to the two other branches of the bridge or substantially constitute these respective branches.

By connecting a combination of circuitry according to FIGS. 7 and 8 ahead of the individual operational amplifier, and connecting another bridge circuit behind the amplifier, a high pass or a low pass of a higher order can be obtained. It is also possible and advantageous to use one of these bridges for high pass formation and the other bridge for low-pass formation. In this manner, a band pass filter is obtained with the aid of a filter fundamental member that contains but a single operation amplifier.

With filter circuit arrangements of this type there may occur the problem of providing for more freedom with respect to the distribution of the pole points and null-points in the complex frequency plane. It may also be desirable that certain components such as capacitors and resistors within the filter circuitry, be made equal or substantially equal as to their electrical values. It is, therefore, also an object of my invention to cope with such problems or desiderata.

To this end, I preferably apply the following further development of my invention which is predicated upon the above-described fundamental features of my invention according to which an operational amplifier with a pair of differential terminals on its input and/or output side has a negative feedback which comprises at least one bridge circuit formed by components of a frequency-selective network conjointly with the pair of differential terminals, the bridge branches having respective reactive impedances which differ from one another in frequency dependence to thereby define a pair of null-points for the damping function of the transmitting attenuation of the filter. Now, according to a further feature of my invention, I connect the input and/or output terminal of the filter with several different bridge points of the appertaining bridge circuit through correspondingly dimensioned coupling resistances and/or I provide at least two negative feedback paths which lead to respectively different bridge points of a bridge circuit. These improvement features of the invention will now be explained more in detail with reference to examples.

The damping function of a low pass of the order $2n$ or of a band pass of the order $n$ has the following form:

$$\frac{U_{I}}{U_{II}} = \frac{1+A_1p+A_2p^2+\ldots+A_{2n}p^{2n}}{1+B_1p^2+B_2p^4+\ldots B_np^{2n}} \qquad (3)$$

The roots of the enumerator polynome are the complex null frequencies $p_o = -\sigma_o \pm j\omega_o$ of the filter; the roots of the denominator polynome are the pole frequencies $p_{oo} = \pm j\omega_{oo}$ of the filter. Since the coefficients $A_n$, $B_n$, being functions of the resistances R and the capacitances C, are real numbers, the natural frequencies always occur in conjugated complex pairs.

Now, the bridge located at the input or output of the amplifier and consisting of the networks $Z_1$, $Z_2$ and $Z_3$, can be so dimensioned that with $n$ predetermined frequencies there will occur a bridge balance at the bridge point $x$. If one connects this point $x$ through a coupling-in or coupling-out conductance parameter with the input or output pole of the filter, these predetermined frequencies are the pole frequencies of the damping curve $U_I I=0$, because no voltage can be fed into or coupled out of a bridge that is compensated.

However, if one connects the balance point $x$ by a negative feedback conductance parameter with the output or input of the amplifier, this will afford the possibility of thus producing null-points of the damping curve, because then the bridge circuit of the negative feedback becomes ineffective at the balance frequencies and the amplifying gain (assumed to be infinitely large) can become fully effective ($U_I I=\infty$). For producing bridge balance at $n$ frequencies, the bridge impedances ($Z_1$, $Z_2$, $Z_3$) must contain at least $2n$ capacitors and $2n$ resistors (canonic circuit). At the other bridge point $y$ there will in general also occur bridge balance at $n$ other frequencies. However, these frequencies in a canonic circuit can no longer be freely chosen. For securing a desired damping curve, the pole frequencies as well as the null frequencies must be prescribable in any desired manner. With a canonic RC bridge filter this is best achieved by employing several coupling-in or coupling-out conductance parameters or negative feedback parameters, as will be explained presently.

Figure 9:
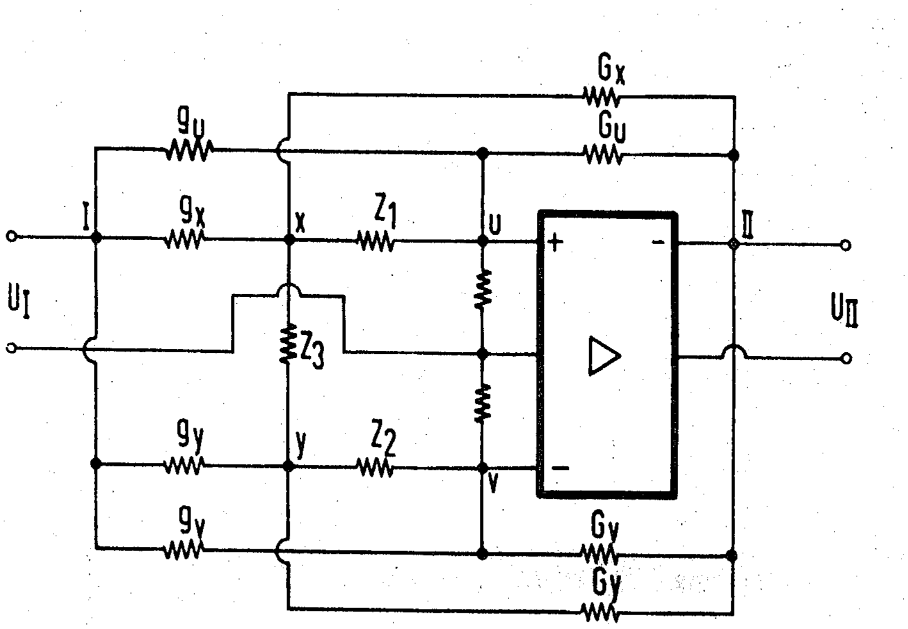
FIGS. 9 to 12 are circuit diagrams of four further embodiments.

Let us consider the case of having the bridge ($Z_1$, $Z_2$, $Z_3$) arranged at the input of the differential amplifier (FIG. 9). The input pole I is connected to the four bridge points ($x$, $y$, $u$, $v$) through the generally complex but preferably ohmic coupling-in parameters ($g\,x$, $g_y$, $g_u$, $g_v$). The four bridge points are connected to the output pole (of the amplifier and the filter) II through the preferably purely ohmic negative feedback conductivity parameters ($G_x$, $G_y$, $G_u$, $G_v$). All of these parameter values must remain small relative to the conductivity values of the bridge ($1/Zn$). The calculation is simplified and limited to the essentials, if these values are presumed to be infinitesimally small as is assumed in the following. In such cases, the damping function of the bridge-RC-filter can be represented in the following form:

$$F(p)=\frac{U_I}{U_{II}}=\frac{K_3Z_3+K_2Z_2-K_1Z_1}{k_3Z_3+k_2Z_2-k_1Z_1} \quad (4)$$

wherein the impedances $Z_1(p)$, $Z_2(p)$, $Z_3(p)$ of the bridge branches are functions of the complex frequency $p=(\sigma+j\omega)$, whereas the coefficients $k_n$, $K_n$ have the following, preferably real values:

$k_1=g_x+g_y-g_v+g_v$; $K_1=G_x+G_y-G_u+G_v$
$k_2=g_x+g_y+g_u-g_v$; $K_2=G_x+G_y+G_u-G_v$
$k_3=g_x-g_y+g_u-g_v$; $K_3=G_x-G_y+G_u-G_v$

The conductivity values $g_u$, $g_v$ or $G_u$, $G_v$ occur only in the difference $(g_u-g_v)$. Consequently, one of the two conductivity values suffices in all cases; the other one can be set equal to zero and hence will cancel out.

Generally, the introduction of grading or evaluating coefficients ($K$, $k$) in the denominator and in the enumerator of the equation (4) results in a higher degree of uniformity as regards the dimensioning of the bridge impedances Z. This affords, for example, satisfying the requirement that two circuit components of the same type, such as two capacitors, will have the same electrical value and hence the same capacitance. As a rule, however, and as mentioned introductorily, it suffices to provide for (a) only one conductivity value for the negative feedback or (b) only one coupling-in value. In the former case (a), we obtain:

$G_y=G_u=G_v=0 \qquad K_1=K_2=K_3=G_x$ $$F(p)=G_x\cdot\frac{Z_3+Z_2-Z_1}{k_3Z_3+k_2Z_2-k_1Z_1} \quad (4a)$$

In the other case (b) we obtain:

$g_x=g_u=g_v=0 \qquad k_1=k_2=-k_3=g_y$ $$F(p)=\frac{1}{g_y}\cdot\frac{K_3Z_3+K_2Z_2-K_1Z_1}{-Z_3+Z_2-Z_1} \quad (4b)$$

The filter design of the type (a) involving a multiple coupling-in with only one negative feedback path will be discussed presently with reference to specific examples, although it will be understood that the following description and explanations apply analogously to the other cases and types of filters mentioned in the foregoing.

Example of a Low Pass

Figure 10:
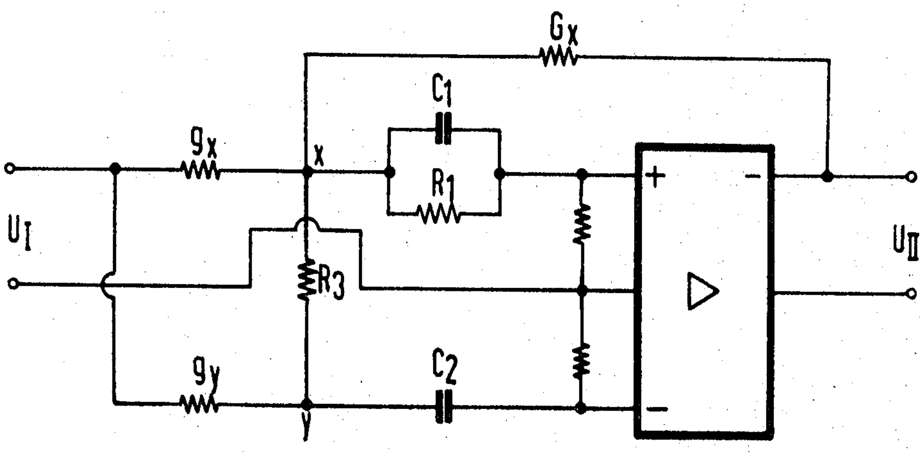

The design of a low pass of the order 2 is shown in FIG. 10. Two coupling-in conductance values ($g_x$ and $g_y$) are sufficient in this case.

According to FIG. 10 we introduce into the formula (4*a*):

$$Z_1=\frac{R_1}{1+pR_1C_1};\ Z_2=\frac{1}{pC_2};\ Z_3=R_3$$

and we further introduce the abbreviations;

$$a=\frac{g_x-g_v}{g_x+g_y} \text{ and } v_0=\frac{G_x}{g_x-g_y}$$

We thus obtain the damping function (4*a*):

$$F(p)=v_0\frac{1+p[R_1C_1+R_3C_2-R_1C_2]+p^2R_1C_1R_3C_2}{1+p[R_1C_1+aR_3C_2-R_yC_2]+p^2aR_1C_1R_3C_2}$$

The roots of the enumerator polynome are the prescribed null frequencies $p_o=-\sigma_o\pm j\omega_o$; the roots of the denominator polynome are the likewise prescribed pole frequencies $p\infty=\pm j\omega\infty$.

It follows that:

$$F(p)=\frac{1+p[2\delta_0/\omega_n^2]+p^2/\omega_n^2}{1+p^2/\omega_\infty} \text{ with } \omega_n^2=\sigma_0^2+\omega_0^2$$

By setting equal values for corresponding members respectively, we obtain the dimensioning formulas for the circuit components of the filter. It follows particularly that:

$$a=\frac{\omega_n^2}{\omega_\infty^2}<1$$

whereby the filter is characterized as a low pass with a pole frequency higher than the null frequency.

The above-discussed form of the low pass RC bridge filter with only one coupling-in resistor $r_o$ but three bridge resistors ($R1$, $R2$, $R_3$) results from the circuitry of FIG. 10 by converting the resistance triangle [$R_3$, $1/g_x$, $1/g_y$] into a resistance star ($r_oR_{32}$).

Example of a High Pass

Figure 11:
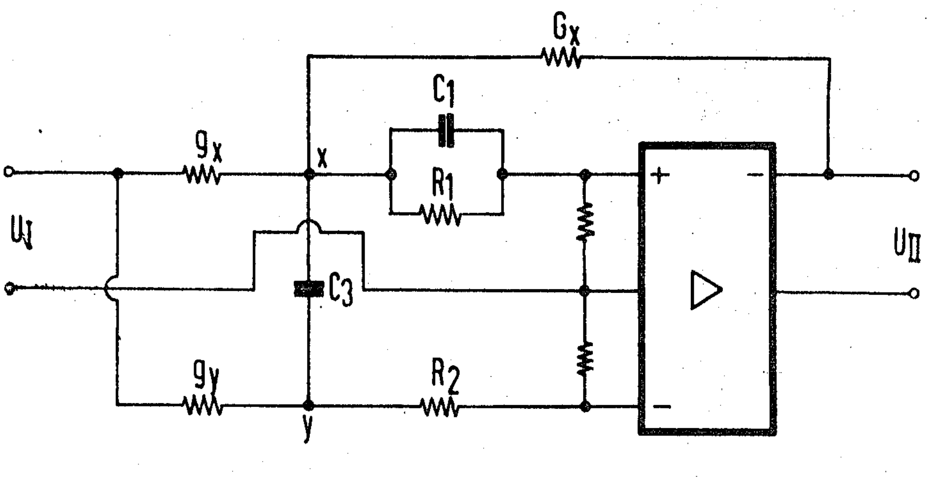

The circuit diagram for a high pass of the order 2 is shown in FIG. 11. In this case, too, there suffice two coupling-in conductivity values ($g_x$ and $g_y$). According to FIG. 11, we insert in the formulas (4*a*):

$$Z_1=\frac{R_1}{1+pR_1C_1};\ Z_2=R_2;\ Z_3=\frac{1}{pC_3}$$

Further, as with the low pass:

$$a=\frac{g_x-g_v}{g_x+g_y} \text{ and } v_0=\frac{G_x}{g_x+g_y}$$

This leads to the following damping function (4*a*):

$$F(p)=v_0\frac{1+pR_1C_1+R_2C_3-R_1C_3+p_2R_1C_1R_2C_3}{1+pR_1C_1+R_2C_3/a-R_yC_3/a+p^2R_1C_1R_2C_3/a}$$

This formula is analogous to that of the low pass with the exception that in the high pass formula:

$$a=\frac{\omega_\infty^2}{\omega_n^2}<1$$

indicating that the pole frequency is lower than the null frequency, this being characteristic of a high pass.

Example of a Band Pass

Figure 12:
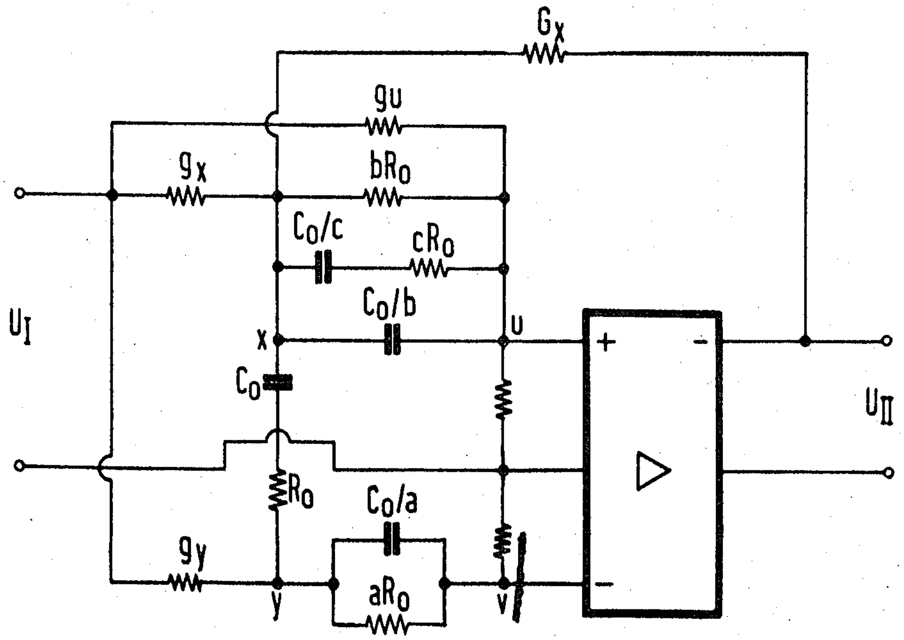

The circuit diagram for a band pass of the order $n=2$ is shown in FIG. 12. It is to be noted that here the band-pass behavior is attained with but a single bridge, neither a double bridge nor a chain connection of a high pass with a low pass being used. We employ the standard frequency $p=(\sigma+j\omega)R_oC_o$; and thus obtain with a circuit diagram according to FIG. 12 the following equations for the bridge impedances and coefficients:

$$Z_1/R_0=\frac{b(1+p)}{1+(2+b/c)p+p^2}$$

$$Z_2/R_0=\frac{a}{1+p}$$

$$Z_3/R_0=\frac{1+p}{p}$$

$k_1=g_x+g_y-g_u$
$k_2=g_x+g_y+g_u$
$k_3=g_x-g_y+g_u$

For simplifying the mathematical treatment, all RC circuits are assumed to have the same time constant $RnCn=1/\omega_o$, whereby the resulting damping curve is geometrically symmetrical to $\omega_o$. Analogously and with corresponding supplementation, the results also apply to an asymmetrical design of the bridge.

We insert the above values of Z and $k$ into formula (4*a*) which then assumes the form:

$$F(p)=v_0\frac{1+A_0p+B_0p^2+A_0p^3+p^4}{1+A_\infty p+B_\infty p^2+A_\infty p^3+p^4} \quad (5a)$$

wherein:

$A_o = 4 + b/c + a - b$ $B_o = 2 + (2+a)(2+b/c) - 2b$ $A\infty = 4 + b/c + k_2a/k_3 - k_1b/k_3$ $B\infty = 2 + (2 + k_2a/k_3)(2 + b/c) - 2k_1b/k_3$ (only four different coefficients $A_oB_oA\infty B\infty$ occur because of the symmetrical design of the bridge impedances).

The roots of the enumerator and denominator polynomes (null points and poles of the camping function) are predetermined by the desired course of the damping curve. Referring to a band filter having a damping curve geometrically symmetrical to the band middle frequency ($\omega_o = 1/R_oC_o$), the following applies in polar coordinate representation with reference to the standard natural frequencies:

$$\text{Null points: } [p_0]_{1\ldots4} = \delta_0^{+1} \exp \pm j\delta_0$$

$$\text{Poles: } [p_\infty]_{1\ldots4} = \pm j\delta_\infty^{+1}$$

so that the four double roots are already given by the three values $\zeta_o, \rho_o, \zeta\infty$. Applicable is the relation:

$$F(p) = \frac{(p-p_{01})(p-p_{02})(p-p_{03})(p-p_{04})}{(p-p_{\infty1})(p-p_{\infty2})(p-p_{\infty3})(p-p_{\infty4})} \quad (5b)$$

The two terms (5*a*) and (5*b*) are set to be equal. The magnitudes $k_o = b/c$ and $k_3$ may be arbitrarily assumed at any desired value, and the other dimensioning magnitudes ($a$, $b$, $k_1$, $k_2$) can then be calculated from the position of the poles and null points ($\zeta_o \rho_o \zeta\infty$) as follows:

$$a = [\delta_0 + 1/\delta_0 + 2\cos\delta_0]^2 k_0$$

$$b = [2 + k_0 + (\delta_0 + 1/\delta_0)\cos\delta_0]^2/k_0 - (\delta_0 - 1/\delta_0)^2 \sin^2\delta_0/k_0$$

$$k_2a/k_3 = [\delta_\infty + 1/\delta_\infty]^2/k_0$$

$$k_1b/k_3 = [2 + k_0]^2/k_0 + [\delta_\infty - 1/\delta_\infty]^2/k_0$$

From $k_1k_2k_3$ there follow the coupling conductivity values:

$g_x = (k_1 + k_3)/2$ $g_y = (k_2 - k_3)/2$ $g_u = (k_2 - k_1)/2$

It follows from the formulas (6) that there always applies the relation $k_2/k_3 > 1$, because $\cos\rho_o < 0$ and because $\zeta_o < \rho\infty$ for a band filter. Hence $g_y$ always results as a positive value. However, if $g_u$ is to become negative ($k_2 < k_1$), then the conductivity value $g_v$ would have to be introduced instead of $g_u$, and the value of $g_v$ would then be positive.

I claim:

1. An electrical filter circuit, comprising an operational amplifier having input means and output means and a feedback path from said output means to said input means, said operational amplifier comprising:

at least a pair of differential terminals; and a frequency selective network in the feedback path of said operational amplifier, said network comprising only resistors and capacitors, and at least one bridge circuit having a plurality of branches, each of two of the branches of said bridge circuit comprising at least one resistor and at least one capacitor connected to each other, and another two of the branches of said bridge circuit including said pair of differential terminals whereby the resistor and capacitor branches of said bridge circuit are so variable with regard to the frequency dependence of their impedance that a pair of null points are thereby determined for the damping function of the transmission attenuation.

2. An electrical filter circuit as claimed in claim 1, wherein one of the branches of the bridge circuit comprises resistor and capacitor means connected in series circuit arrangement and another of the branches of said bridge circuit comprises resistor and capacitor means in parallel connection.

3. An electrical filter circuit as claimed in claim 1, wherein the output means of said operational amplifier comprises a pair of output terminals, and one of the branches of the bridge circuit comprises a resistor having a tap connected to an output terminal of said operational amplifier and a pole point pair of the damping function are determined.

4. An electrical filter circuit as claimed in claim 1, wherein the input means of said operational amplifier comprises a differential input and the output means of said operational amplifier comprises a differential output, and the network in the feedback path of said operational amplifier comprises a first bridge circuit connected to said input and a second bridge circuit connected to said output, each of said first and second bridge circuits determining a pair of null points for the damping function of the transmission attenuation.

5. An electrical filter circuit as claimed in claim 4, wherein at least one of said first and second bridge circuits has a tap defining a pole point pair.

6. An electrical filter circuit as claimed in claim 1, further comprising a subordinate pair of connecting terminals in the feedback path of said operational amplifier, and wherein the network in the feedback path of said operational amplifier comprises a pair of bridge circuits connected in parallel with each other, one of said bridge circuits being connected in said feedback path and the other of said bridge circuits being connected to a terminal of said subordinate pair of connecting terminals and defining a pole point pair.

7. An electrical filter circuit as claimed in claim 1, further comprising coupling resistors, and wherein the input means of said operational amplifier comprises a pair of input terminals and the output means of said operational amplifier comprises a pair of output terminals and the bridge circuit of said network has a plurality of bridge points, and wherein one of the terminals of said input and output means is connected to different bridge points via said coupling resistors.

8. An electrical filter circuit as claimed in claim 7, wherein there are at least two feedback paths from the output means to the input means of said operational amplifier and said feedback paths are connected to various ones of said bridge points.